Patented Feb. 6, 1951

2,540,946

UNITED STATES PATENT OFFICE

2,540,946

PYRIDOXAL-HISTAMINE AND PROCESSES FOR PREPARING THE SAME

Dorothea Heyl Hoffman, Rahway, Stanton A. Harris, Westfield, and Karl Folkers, Plainfield, N. J., assignors to Merck & Co., Inc., Rahway, N. J., a corporation of New Jersey No Drawing. Application December 18, 1947, Serial No. 792,618

6 Claims. (Cl. 260—296)

This invention is concerned generally with novel derivatives of pyridoxal. More particularly it relates to N-pyridoxyl substituted amines, and to the preparation of these compounds by condensing pyridoxal with primary amines and hydrogenating the Schiff base thus produced.

These novel N-pyridoxyl-amines, and in particular those derived from naturally-occurring amino acids, act as depressors, that is, as agents which are useful in lowering blood pressure. These compounds may be coupled with aromatic diazonium compounds to yield colored products which are useful as dyes. These compounds are also of value as growth-promoting agents.

These N-pyridoxyl-amines may be chemically represented as follows:

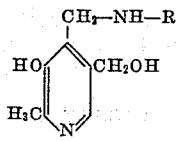

wherein R is an alkyl, aryl, aralkyl or heterocyclic radical. Examples of these N-pyridoxyl-amines are: N-pyridoxyl-aniline, N-pyridoxyl-benzylamine, N-pyridoxyl-pyridoxamine, and the like.

The preferred N-pyridoxyl-amines are those in which the parent amine (RNH₂) is derived from a naturally-occurring amino acid, as for example N-pyridoxyl-tyramine, N-pyridoxyl-tryptamine, N-pyridoxyl-β-phenyl-ethylamine, N-pyridoxyl-histamine, and the like. The depressor action of these N-pyridoxyl-amines is particularly surprising in view of the fact that the corresponding parent amines, tyramine, tryptamine and β-phenylethylamine all act as pressors, that is as agents which raise the blood pressure.

We have discovered that these N-pyridoxyl-amine compounds can be prepared by reacting pyridoxal with the appropriate amine to form a Schiff base which is then hydrogenated to produce the desired N-pyridoxyl-amine. This reaction may be chemically represented, employing tyramine as the starting amine, as follows:

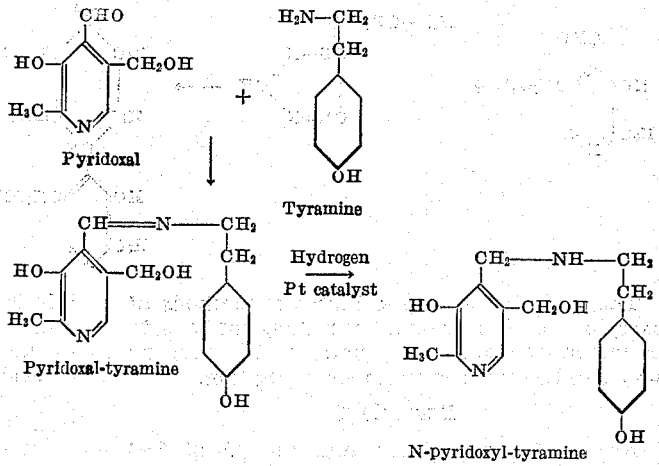

The Schiff base obtained by the condensation of pyridoxal and the amine does not exhibit the depressor activity, characteristic of the hydrogenated product, the N-pyridoxyl-amine.

The reaction between pyridoxal and the primary amine is conveniently conducted in a medium comprising a lower aliphatic alcohol such as ethanol, methanol, and the like. The Schiff base, which is ordinarily a yellow compound, may be isolated, if desired, by evaporating the alcohol solution, but it is ordinarily preferred to react the alcohol containing the Schiff base directly with hydrogen in contact with a hydrogenation catalyst such as a platinum metal catalyst. The catalyst is removed from the hydrogenation mixture by filtration and the N- pyridoxyl-amine is isolated from the resulting alcoholic solution by conventional means.

When pyridoxal is reacted with histamine in substantially anhydrous alcoholic solution the product obtained (which melts at approximately 240–241° C. dec.) has the characteristic yellow color of the corresponding Schiff base. When this pyridoxal-histamine compound is reacted with hydrogen, the compound absorbs hydrogen to form N-pyridoxyl-histamine. These reactions may be chemically represented as follows:

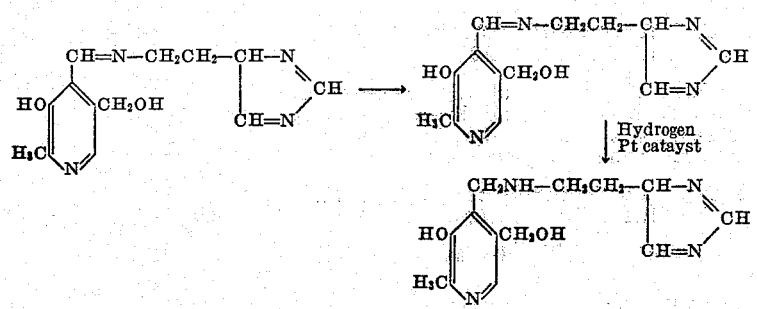

It is a preferred feature of the present invention, however, that when pyridoxal and histamine are condensed in aqueous-alcohol, the product obtained is a white material which melts at approximately 252–253° C. dec., and which does not absorb hydrogen under the conditions employed above for preparing N-pyridoxyl-histamine. This white pyridoxal-histamine compound shows pronounced anti-histamine activity and should be of value in the study and treatment of allergic disorders such as hay fever and urticaria. The preparation of this white, saturated pyridoxal-histamine compound may be chemically represented as follows:

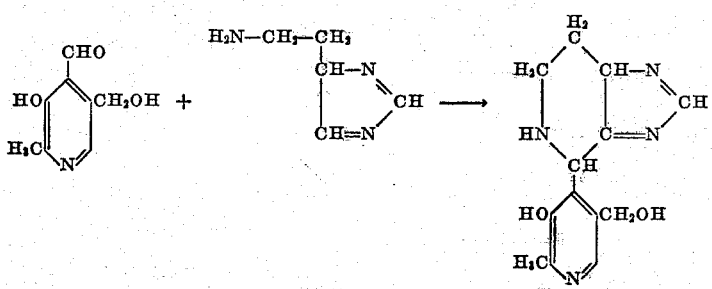

The following examples illustrate methods of carrying out the present invention, but it is to be understood that these examples are given by way of illustration and not of limitation.

Example 1

About 4.15 gms. of tyramine and about 5.06 gms. of pyridoxal are suspended in about 100 cc. of absolute methyl alcohol. After about 5 minutes' standing, a clear yellow solution is obtained. This solution is filtered, diluted to about 150 cc. with methyl alcohol; 0.2 mg. of Adams' platinum catalyst is added and the resulting mixture is shaken under hydrogen at a pressure of approximately 2–3 atmospheres for approximately ½ hour. The catalyst is removed by filtration, the colorless solution is cooled in an ice bath, and alcoholic hydrogen chloride is added slowly until the solution is acid to Congo red. The solution is cooled for an additional period of time and the crystals which precipitate are filtered and washed with alcohol and ether to produce approximately 9.6 gms. of N-pyridoxyl-tyramine dihydrochloride; M. P. 238–239° C.; yield approximately 88% of theory.

Example 2

About 3.62 gms. of β-phenyl-ethylamine and about 5.00 gms. of pyridoxal are dissolved in 150 cc. of absolute methyl alcohol and the resulting mixture stirred for approximately ½ hour, at which time the reaction is substantially complete. The bright yellow solution thus obtained is filtered and evaporated to dryness under reduced pressure. The residual material is recrystallized from ether-petroleum ether, and dried to produce approximately 6.90 gms. of pyridoxal-β-phenyl-ethylamine; yield approximately 86% of theory. This product is further purified by two recrystallizations from alcohol-ether-petroleum ether to produce substantially pure material; M. P. 101.5–102.0° C.

100 cc. of absolute methyl alcohol containing 4.78 gms. of pyridoxal-β-phenylethylamine and about 0.1 gm. of Adams' platinum catalyst is shaken under hydrogen at a pressure of approximately 2–3 atmospheres until the theoretical amount of hydrogen has been absorbed, and the solution has become colorless. The catalyst is removed by filtration and the filtrate evaporated to approximately 30 cc. Alcoholic hydrogen chloride is added, while cooling the resulting mixture by immersion in an ice bath, until the solution is acid to Congo red. The crystals which separate from the solution are recovered and dried to produce approximately 5.18 gms. of N-pyridoxyl-β-phenyl-ethylamine dihydrochloride; yield approximately 85% of theory. This product is further purified by two recrystallizations from methyl alcohol-ether to produce substantially pure material; M. P. 227–228° C.

Example 3

About 1.00 gm. of tryptamine and about 1.04 gms. of pyridoxal are dissolved in 40 cc. of absolute ethyl alcohol and the resulting mixture stirred for approximately 5 minutes, at which time the reaction is substantially complete. The clear yellow solution thus obtained is filtered and evaporated to dryness under reduced pressure. The residual material is recrystallized from ethyl alcohol and dried to produce approximately 1.4 gms. of pyridoxal-tryptamine; M. P. 160.5–161.0° C.; yield approximately 73% of theory.

125 cc. of absolute methyl alcohol containing 1.00 gm. of pyridoxal-tryptamine and about 0.1 gm. of Adams' platinum catalyst is shaken under hydrogen at a pressure of approximately 2–3 atmospheres until the theoretical amount of hydrogen has been absorbed and the solution has become colorless. The catalyst is removed by filtration and the filtrate evaporated to about 30 cc. Alcoholic hydrogen chloride is added, while cooling the resulting mixture by immersion in an ice bath, until the pH of the solution is approximately 6.0. Ether is then added to the resulting alcoholic solution to precipitate the crude monohydrochloride, which is recrystallized from aqueous alcohol to produce 0.95 gm. of substantially pure N-pyridoxyl-tryptamine hydrochloride; M. P. 222.5–223.0° C.; yield approximately 84% of theory.

*Example 4*

About 3.31 gms. of pyridoxamine and about 3.30 gms. of pyridoxal are shaken with about 400 cc. of ethyl alcohol for approximately 5 hours at which time the reaction is substantially complete. The resulting solution is clarified by filtration and the filtrate evaporated to dryness under reduced pressure. The residual material is recrystallized from ethyl alcohol and dried to produce approximately 4.19 gms. of pyridoxal-pyridoxamine; M. P. 232–233° C.; yield approximately 67% of theory.

400 cc. of ethyl alcohol containing about 2 gms. of pyridoxal-pyridoxamine was shaken with 0.15 gm. of Adams' platinum catalyst under 2–3 atmospheres of hydrogen. After removal of the catalyst by filtering, the solution was concentrated to dryness. The residue was dissolved in ethyl alcohol, cooled in an ice bath, and made acid to Congo red by the dropwise addition of alcoholic hydrogen chloride. The crystals of N-pyridoxyl-pyridoxamine dihydrochloride, after filtering and washing with alcohol, were obtained in a yield of 0.74 g.; yield approximately 30% of theory. After two recrystallizations from aqueous alcohol, the melting point was 222–223° C. dec. Anal.— Calc'd. for $C_{16}H_{23}N_3O_4Cl_2$: C, 48.98; H, 5.91; N, 10.71. Found: C, 49.42; H, 6.23; N, 10.63.

*Example 5*

About 0.68 gm. of tyramine and about 0.83 gm. of pyridoxal are dissolved in 35 cc. of absolute methyl alcohol and the resulting mixture is stirred for approximately 5 minutes at which time the reaction is substantially complete. The resulting solution is filtered and evaporated to dryness under reduced pressure. The residual material is recrystallized 4 times, first from alcohol, and then from alcohol-ether-petroleum ether to produce approximately 1.28 gms. of pyridoxal-tyramine; M. P. 168.0–168.5° C.; yield approximately 90% of theory.

About 125 cc. of absolute methyl alcohol containing about 0.59 gm. of pyridoxal-tyramine and about 0.1 gm. of Adams' platinum catalyst, is shaken under hydrogen at pressure of approximately 2–3 atmospheres until the theoretical amount of hydrogen is absorbed and the solution has become colorless. The catalyst is removed by filtration and the filtrate evaporated to dryness. The residual material is dissolved in ethyl alcohol and alcoholic hydrogen chloride is added to the resulting solution, with cooling, until the solution is acid to Congo red. The crystals which separate from the solution are recovered and purified by recrystallization from water-alcohol-ether to produce approximately 0.5 gm. of N-pyridoxyl-tyramine dihydrochloride; M. P. 238–239° C.; yield approximately 66% of theory.

*Example 6*

About 3 drops of aniline and about 0.1 gm. of pyridoxal are dissolved in 10 cc. of absolute ethyl alcohol, and the resulting mixture is heated at the boiling point for approximately 5 minutes, at which time the reaction is substantially complete. The resulting solution is filtered and evaporated to dryness under reduced pressure to produce substantially pure pyridoxal-aniline; M. P. 178.5–179.0° C.

This compound may be hydrogenated, substantially as described in Example 1 above, to produce N-pyridoxyl-aniline.

*Example 7*

About 1.07 gms. of benzylamine and about 1.67 gms. of pyridoxal are dissolved in 40 cc. of absolute ethyl alcohol and the resulting mixture stirred for approximately 5 minutes, at which time the reaction is substantially complete. The reaction solution is filtered and evaporated to dryness under reduced pressure. The residual material is recrystallized from alcohol-ether-petroleum ether to produce approximately 0.9 gm. of pyridoxal-benzylamine; M. P. 113.5–114.5° C.; yield approximately 35% of theory.

75 cc. of absolute methyl alcohol containing 0.40 gm. of pyridoxal-benzylamine and about 0.1 gm. of Adams' platinum catalyst is shaken under hydrogen at a pressure of approximately 2–3 atmospheres until the theoretical quantity of hydrogen has been absorbed and the solution has become colorless. The catalyst is removed by filtration and the filtrate evaporated to dryness. The residual material is dissolved in ethyl alcohol, and alcoholic hydrogen chloride is added to the resulting solution, with cooling, until the solution is acid to Congo red. Ether is then added to the alcoholic solution to precipitate the crude dihydrochloride, and this product is recrystallized 3 times from alcohol-ether solution (a few drops of alcoholic hydrogen chloride are added during the last recrystallization) to produce approximately 0.28 gm. of N-pyridoxyl-benzylamine dihydrochloride; M. P. 219–220° C.; yield approximately 54% of theory.

*Example 8*

About 2.00 gms. of isobutylamine and about 4.56 gms. of pyridoxal are dissolved in 30 cc. of absolute ethyl alcohol and the resulting mixture stirred for approximately 1 hour, at which time the reaction is substantially complete. The resulting solution is filtered and evaporated to dryness under reduced pressure. The residual material is dissolved in ether-petroleum-ether solvent by heating and the solution is cooled whereupon unreacted pyridoxal crystallizes at once and is removed by filtration. The filtrate is allowed to stand whereupon pyridoxal isobutylamine crystallized and is recovered by filtration and dried; M. P. 67–68° C.; yield approximately 45% of theory. Anal.—Calc'd for $C_{12}H_{18}N_2O_2$: % C, 64.84; % H, 8.16; % N, 12.61. Found: % C, 64.89; % H, 8.05; % N, 12.77.

125 cc. of absolute methyl alcohol containing about 2.66 gms. of pyridoxal isobutylamine and about 0.1 gm. of Adams' platinum catalyst is shaken under hydrogen at a pressure of approximately 2-3 atmospheres until the theoretical amount of hydrogen has been absorbed and the solution has become colorless. The catalyst is removed by filtration and the filtrate is evaporated to about 30 cc. volume. Alcoholic hydrogen chloride is added with cooling until the pH of the solution is approximately 6.0. Ether is then added to the resulting solution to precipitate N-pyridoxyl - isobutylamine monohydrochloride, which is recovered by filtration and dried; M. P. 204-205° C. dec.; yield approximately 75% of theory. Anal.—Calc'd for $C_{12}H_{21}N_2O_2Cl$: % C, 55.27; % H, 8.12; % N, 10.75. Found: % C, 55.57; % H, 7.90; % N, 10.67.

*Example 9*

A suspension of about 5.0 gms. of histamine dihydrochloride and 5.0 gms. of sodium bicarbonate in 150 cc. of absolute ethyl alcohol is heated at the boiling point for approximately 35 minutes. The insoluble inorganic material is recovered by filtration and the alcoholic solution treated with approximately 4.5 gms. of pyridoxal. The solution is stirred for approximately 1 hour and the resulting thick, bright yellow precipitate is recovered by filtration. Additional crystals are obtained by cooling the filtrate to produce a total yield of crude condensation product equal to approximately 2.93 gms. This material is recrystallized from alcohol to produce substantially pure pyridoxal histamine (unsaturated Schiff base modification); M. P. 240-241° C. dec.

1.0 gm. of pyridoxal histamine, prepared as described above, is dissolved in about 300 cc. of absolute methyl alcohol, 0.1 gm. of Adams' platinum catalyst is added and the mixture shaken under hydrogen at a pressure of approximately 2-3 atmospheres until the theoretical amount of hydrogen has been absorbed. The catalyst is removed by filtration and the filtrate is evaporated to small volume and excess alcoholic hydrogen chloride added to the concentrated solution. The crude crystals which precipitate are recovered by filtration and dried to produce approximately 1.3 gms. of crude N-pyridoxyl-histamine dihydrochloride. This product is purified by three recrystallizations from ethyl alcohol-water to produce substantially pure N-pyridoxyl-histamine dihydrochloride; M. P. 236-237° C. dec.

A sample of N-pyridoxyl-histamine dihydrochloride, prepared as described above and dried at 100° C. (1 mm. pressure) for approximately 1½ hours, analyzed as follows: Anal.— Calc'd for $C_{13}H_{20}N_4O_2Cl_2$: % C, 46.57; % H, 6.01; % N, 16.71. Found: % C, 46.84; % H, 6.10; % N, 16.96.

*Example 10*

About 1.84 gms. of histamine dihydrochloride are dissolved in about 5 cc. of water and about 1.68 gms. of potassium hydroxide in about 5 cc. of water is added to this solution. About 100 cc. of ethyl alcohol is added to this solution followed by about 1.67 gms. of pyridoxal. The initial bright yellow color gradually fades and a thick white precipitate appears. The resulting mixture is allowed to stand for approximately ½ hour and then cooled in ice. The white crystalline precipitate is recovered by filtration and washed thoroughly with water followed by alcohol and then ether. The product is dried to produce approximately 0.76 gm. of pyridoxal histamine (saturated isomer); M. P. 252-253° C. dec.; yield approximately 29% of theory.

A sample of pyridoxal histamine, prepared as described above and dried at approximately 100° C. (1 mm. pressure) for approximately 4 hours, analyzed as follows: Anal.—Calc'd for $C_{13}H_{18}N_4O_2$: % C, 59.98; % H, 6.20; % N, 21.53. Found: % C, 60.14; % H, 6.10; % N, 21.39.

Modifications may be made in carrying out the present invention without departing from the spirit and scope thereof and the invention is to be limited only by the appended claims.

We claim:

1. Pyridoxal-histamine, having the empirical formula $C_{13}H_{16}N_4O_2$, and selected from the group consisting of compounds having the structural formulae:

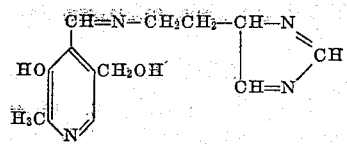

and

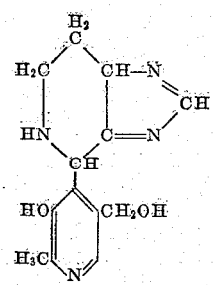

2. Pyridoxal-histamine, having the empirical formula $C_{13}H_{16}N_4O_2$, having the structural formula:

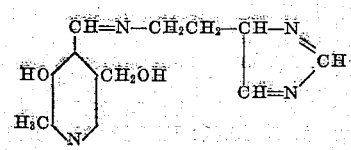

and having, when in substantially pure form, a yellow color and a melting point of approximately 240-241° C.

3. Pyridoxal-histamine, having the empirical formula $C_{13}H_{16}N_4O_2$, having the probable structural formula:

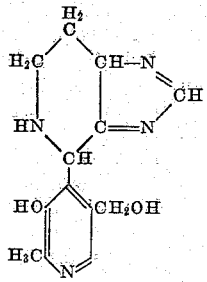

and having, when in substantially pure form, a white color and a melting point of approximately 252-253° C. dec.

4. The process of preparing pyridoxal histamine having the empirical formula $C_{13}H_{16}N_4O_2$, having the probable structural formula:

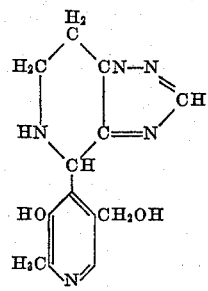

and having, when in substantially pure form, a white color and a melting point of approximately 252–253° C. dec., which comprises reacting pyridoxal with histamine, said reaction being carried out in a medium comprising aqueous alcohol.

5. The process of preparing a pyridoxal-histamine compound having the empirical formula $C_{13}H_{16}N_4O_2$, and selected from the group consisting of compounds having the structural formulae:

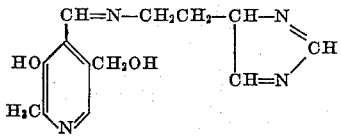

and

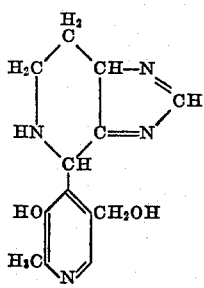

which comprises reacting pyridoxal with histamine, said reaction being carried out in alcoholic solution.

6. The process of preparing pyridoxal-histamine, having the empirical formula $C_{13}H_{16}N_4O_2$, having the structural formula:

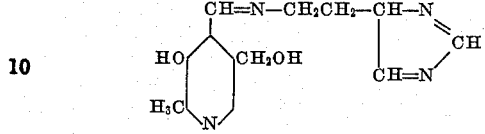

and having, when in substantially pure form, a yellow color and a melting point of approximately 240–241° C., which comprises reacting pyridoxal with histamine, said reaction being carried out in a medium comprising substantially anhydrous alcohol.

DOROTHEA HEYL HOFFMAN.
STANTON A. HARRIS.
KARL FOLKERS.

REFERENCES CITED

The following references are of record in the file of this patent:

Snell: Jour. Biol. Chem. 154 313–314 (1944).
Richter: Textbook of Organic Chemistry, page 502 (1938 edition).
Beilstein, vol. 29, General Formelregister $C_1$–$C_{13}$, page 1155.